US012717035B2

(12) United States Patent
Jachmann

(10) Patent No.: US 12,717,035 B2
(45) Date of Patent: Aug. 25, 2026

(54) OPTOELECTRONIC SENSOR AND METHOD FOR DETECTING OBJECTS

(71) Applicant: SICK AG, Waldkirch (DE)

(72) Inventor: Fabian Jachmann, Waldkirch (DE)

(73) Assignee: SICK AG, Waldkirch (DE)

( * ) Notice: Subject to any disclaimer, the term of this patent is extended or adjusted under 35 U.S.C. 154(b) by 1054 days.

(21) Appl. No.: 17/844,327

(22) Filed: Jun. 20, 2022

(65) Prior Publication Data

US 2022/0404501 A1 Dec. 22, 2022

(30) Foreign Application Priority Data

Jun. 21, 2021 (EP) .................................... 21180683

(51) Int. Cl.

*G01S 17/88* (2006.01)
*G01S 7/481* (2006.01)
*G01S 7/4865* (2020.01)

(52) U.S. Cl.

CPC ............ *G01S 17/88* (2013.01); *G01S 7/4814* (2013.01); *G01S 7/4817* (2013.01); *G01S 7/4865* (2013.01)

(58) Field of Classification Search

CPC ...... G01S 17/88; G01S 17/931; G01S 7/4814; G01S 7/4815; G01S 7/4817; G01S 7/4865

See application file for complete search history.

(56) References Cited

U.S. PATENT DOCUMENTS

2017/0118915 A1* 5/2017 Middelberg ......... A01B 69/008
2019/0154816 A1* 5/2019 Hughes .................... G01D 5/34
2020/0025923 A1* 1/2020 Eichenholz ........... G01S 17/931
2020/0183005 A1 6/2020 Van Loo et al.
2020/0249354 A1* 8/2020 Yeruhami ............ G01S 7/4815

FOREIGN PATENT DOCUMENTS

DE 102007023888 A1 1/2008
DE 10141294 B4 12/2016
DE 102018101846 A1 8/2019
DE 102019213515 A1 4/2020
EP 1927867 A1 * 6/2008 ............ G01S 17/48
EP 1927867 B1 4/2012
EP 2469296 B1 10/2012

(Continued)

*Primary Examiner* — Yuqing Xiao
*Assistant Examiner* — Isabelle Lin Boegholm
(74) *Attorney, Agent, or Firm* — Nath, Goldberg & Meyer; Jerald L. Meyer.

(57) ABSTRACT

A sensor is provided for the detection of objects in a monitored zone that has at least one light transmitter for transmitting a plurality of mutually separated light beams, at least one light receiver for generating a respective received signal from the light beams remitted in the monitored zone, a movable deflection unit with whose aid the transmitted light beams are periodically guided through the monitored zone to respectively scan a scanning layer in the course of the movement of the scanning unit by the separated light beams, and a control and evaluation unit that is configured to acquire information on the objects in the monitored zone from the respective received signal. The presence of a safety-relevant object is determined per scanning layer and a decision whether a safety-directed response is triggered is made by a common evaluation of the presence of a safety-relevant object determined per scanning layer.

19 Claims, 5 Drawing Sheets

(56) References Cited

FOREIGN PATENT DOCUMENTS

Figure 1:
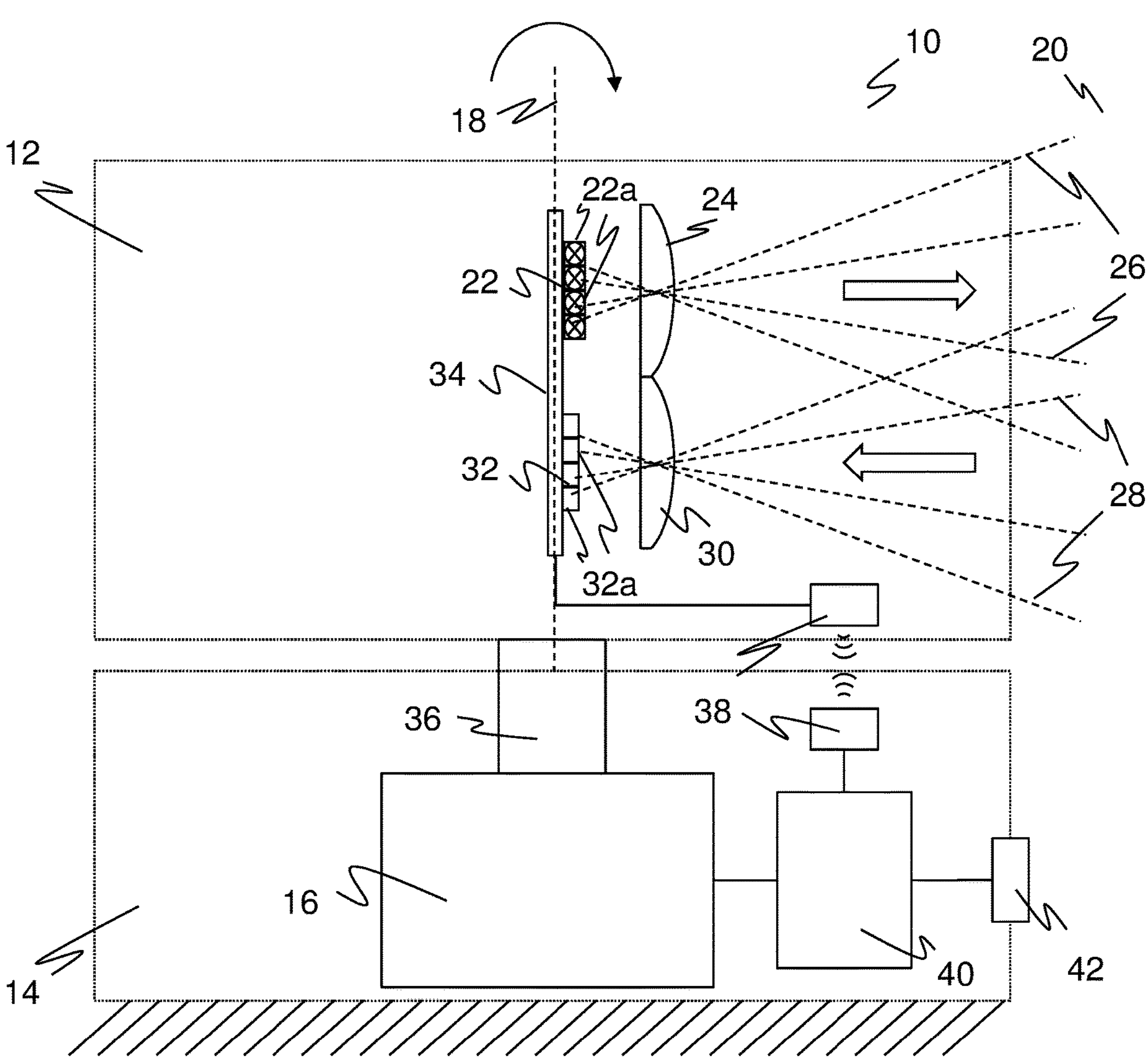

| | | | | |
|---|---|---|---|---|
| EP | 3220164 | B1 | 3/2018 | |
| EP | 3517999 | A1 * | 7/2019 | ............. G01S 17/08 |
| EP | 3521860 | A1 | 8/2019 | |
| JP | 2002-140790 | A | 5/2002 | |
| JP | 2008026997 | A | 2/2008 | |
| JP | 2019164121 | A | 9/2019 | |
| JP | 2020051971 | A | 4/2020 | |

* cited by examiner

Figure 6
| Angle sector | 1 | 2 | 3 | 4 | 5 | 6 | 7 |
|---|---|---|---|---|---|---|---|
| Scanning plane #1 | 0 | 0 | x | x | 0 | 0 | 0 |
| Scanning plane #2 | 0 | x | 0 | 0 | 0 | 0 | 0 |
| Scanning plane #3 | 0 | 0 | 0 | 0 | 0 | x | x |
Figure 7
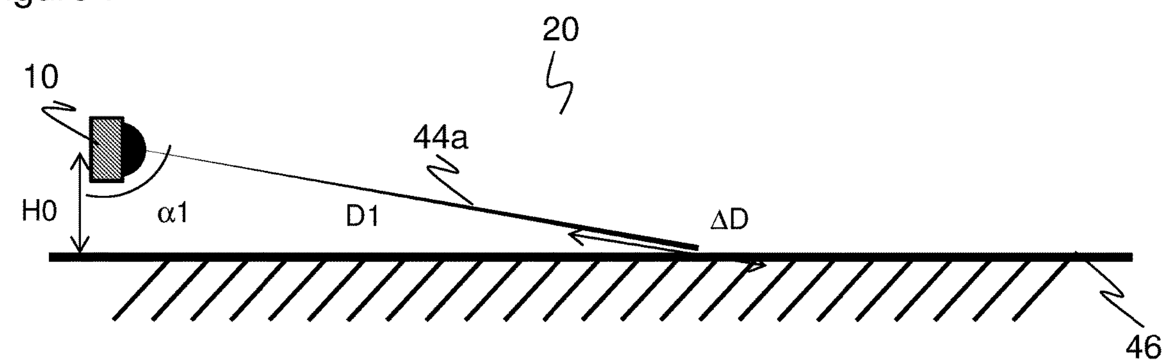
Figure 8
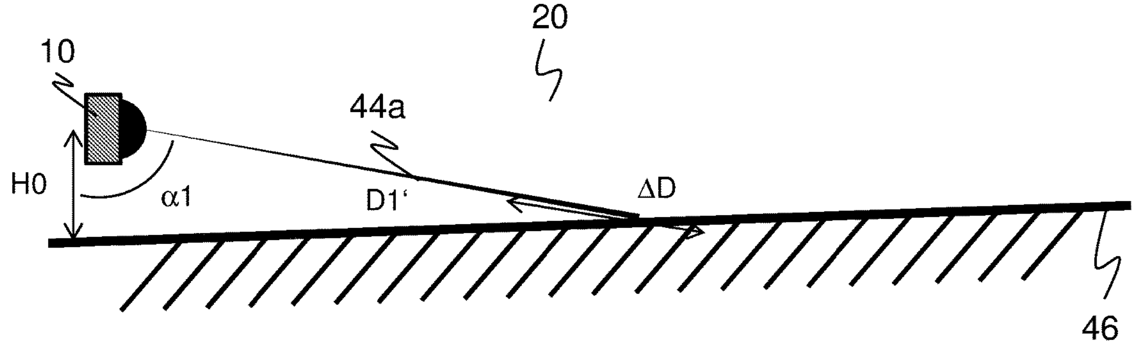

OPTOELECTRONIC SENSOR AND METHOD FOR DETECTING OBJECTS

The invention relates to an optoelectronic sensor, in particular to a laser scanner, and to a method for detecting objects in a monitored zone.

Laser scanners are frequently used for optical monitoring. In this respect, a light beam generated by a laser periodically sweeps over a monitored zone with the aid of a deflection unit. The light is remitted at objects in the monitored zone and is evaluated in the laser scanner. A conclusion is drawn on the angular location of the object from the angular position of the deflection unit and additionally on the distance of the object from the laser scanner from the time of flight while using the speed of light. In this respect, two general principles are known of determining the time of flight. In phase-based processes, the transmitted light is modulated and the phase shift of the received light with respect to the transmitted light is evaluated. In pulse-based processes, such as are preferably used in safety engineering, the laser scanner measures the time of flight until a transmitted light pulse is received again. In a pulse averaging process known, for example, from EP 2 469 296 B1, a plurality of individual pulses are transmitted for a measurement, and the received pulses are statistically evaluated.

An important application is the securing of a hazard source in safety engineering. In this respect, the laser scanner monitors a protected field which may not be entered by operators during the operation of the machine. Since the laser scanner acquires angle and distance information, two-dimensional positions of objects in the monitored zone and thus also in the protected field can be determined. If the laser scanner recognizes an unauthorized intrusion into the protected field, for instance a leg of an operator, it triggers an emergency stop of the machine.

Sensors used in safety technology have to work particularly reliably and must therefore satisfy high safety demands, for example the EN13849 standard for safety of machinery and the machinery standard EN61496 for electrosensitive protective equipment (ESPE). A number of measures have to be taken to satisfy these safety standards such as reliable electronic evaluation by redundant, diverse electronics, function monitoring and/or provision of individual test targets with defined degrees of reflection which have to be recognized at the corresponding scanning angles.

The measurement zone of a laser scanner is restricted to its two-dimensional scanning plane. In addition, a high degree of calibration is requires so that the scanning plane extends in parallel with the ground. This becomes even more difficult with a great range and a large scanning angle. In environments with interfering objects, in particular in the outdoor region, availability problems can occur, that is unnecessary shutdowns due to objects that are actually not relevant to safety. The detection algorithm admittedly possibly filters objects that are too small or are transient, but does react to persistent interfering objects such as individual blades of grass.

Laser scanners are known outside safety engineering that monitor a fan of a plurality of scanning layers having regular or irregular mutual angular distances and thus ultimately a three-dimensional spatial zone. Such laser scanners are called multilayer scanners or sometimes also multiplane scanners. To date, however, there are no safe multilayer scanners, that is those that are equipped and certified in accordance with the requirements of functional safety in the above sense for use in safety engineering. Existing safety laser scanners are always single-layer or single-plane scanners.

3D cameras that also satisfy technical safety applications are known for the detection of three-dimensional spatial zones. Multilayer scanners and 3D cameras have very different properties with respect to range, field of view, resolution, in particular in the elevation direction, and quality of the detected 3D measurement points. Neither of the two technologies can generally be considered better; their suitability depends on the specific application situation.

There is accordingly a hitherto unsatisfied demand for a safety laser scanner having three-dimensional detection. In this respect, the procedures of either single-layer scanners or 3D cameras cannot be simply transferred. If every object detection in one of the multiple scanning layers were naively to be evaluated as safety critical in a multilayer scanner in an analogous manner to the single scanning plane of a single-layer scanner, the unnecessary shutdowns would multiply. In addition, protected fields would at least have to be configured with consideration of the ground in the downwardly directed scanning layers to at least avoid permanent incorrect shutdowns caused by the ground. The evaluations for 3D point clouds of a 3D camera, on the other hand, are exceptionally complex and cannot be achieved with the customary processing and memory capacities of a laser scanner. In addition, such evaluations are not suitable at all for point clouds of a laser scanner, for example due to the completely different vertical resolution.

As representative for a large number of documents, EP 3 517 999 A1 is named as a disclosure source for a multilayer scanner. The possibility of a use in the field of safety engineering with a monitoring of protected fields is mentioned in passing therein. However, this only repeats the protected field evaluation and safe design known from single-layer scanners that cannot be transferred in this manner to multilayer scanners or that would bring about the innumerable erroneous shutdowns already addressed above. The actual thrust of EP 3 517 999 A1 is a special optical configuration that can equally be used in a safe multilayer scanner, but does not contribute to its safety and availability.

EP 1 927 867 B1 discloses a safe multilayer sensor that generates a fan of diverging monitoring layers in an embodiment. It is, however, not a laser scanner; the layers are detected by immobile and instead spatially resolving light receivers.

In addition, no special features of the evaluation for the safe detection of objects in a plurality of layers are looked at.

A laser scanner is described in EP 3 220 164 B1 that filters objects that are too small and are detected briefly as non-safety relevant in its protected field monitoring. This evaluation, however, only relates to the single scanning plane layer of a single-layer scanner.

In DE 101 41 294 B4, the rear scanning zone of a laser scanner is utilized for use in a vehicle by mirror arrangements to gain additional scanning layers in the front scanning zone. The aim is, however, not multilayer scanning, but rather redundancy, either to increase the effective scanning frequency or to compensate pitch movements of the vehicle. No evaluation suitable for a safe multilayer scanner can accordingly be seen from the document. DE 101 41 294 B4 furthermore describes ground recognition. The latter is also described for a laser scanner having a more complex ground model in EP 3 521 860 A1.

It is therefore the object of the invention to improve safe monitoring using a sensor of the category.

This object is satisfied by an optoelectronic sensor, in particular a laser scanner, and by a method for detecting objects in a monitored zone in accordance with the respective independent claim. A light transmitter transmits a plurality of mutually separated light beams into the monitored zone, with a plurality of light sources and/or splitting optical elements being able to be provided for this purpose. The transmitted light beams are not to be understood as beams in the sense of geometrical optics within a larger bundle of rays, but rather as isolated scanning beams, in particular collimated and having a smaller cross-section, so that isolated, mutually spaced apart light spots correspondingly arise in the monitored zone on impinging onto an object.

At least one light receiver is able to generate a respective received signal from the light beams that are remitted from different directions when the transmitted light beams are reflected at objects in the monitored zone. A plurality of light reception elements and/or zones or pixel (groups) of a light receiver are provided for this purpose. No difference is made in terminology between directed reflection and non-directed scatter or remission here.

A movable, preferably rotating, deflection unit guides the transmitted light beams periodically through the monitored zone-Each of the transmitted light beams here scans its own scanning layer and a multilayer scan and in particular a multilayer scanner or multilayer (laser) scanner are produced overall. The light transmitter and/or the light receiver are preferably arranged co-movable with the deflection unit. A movable, in particular rotating, measuring head or optical head is thereby produced. Alternatively, the light transmitter and/or light receiver is/are stationary and are accordingly at rest with respect to the sensor or its housing while the deflection unit is, for example, designed as a rotating mirror. It must be noted in this case that the layers change their vertical location in the course of the movement of the rotating mirror.

A control and evaluation unit detects objects per light beam or scanning layer by evaluating the received signals and in particular determines the time of flight and thus the distance from the respectively scanned object therefor.

The invention starts from the basic idea of a safe evaluation for the recognition of persons over the plurality of scanning layers. For this purpose, safety-relevant objects are first detected within the respective scanning layer. This evaluation in particular corresponds to those of a conventional safe single-layer scanner per scanning layer; it is multiplied for the plurality of scanning layers. The information as to in which scanning layer a respective safety-relevant object was recognized or determined as present is subsequently evaluated in an overarching manner over the scanning layers and a decision is made using them as to whether a safety-directed response is triggered. This is in particular done by outputting a corresponding securing signal to a machine that is monitored by the sensor and that thereupon moves into a safe state, for example by shutting down, braking, or evading.

In accordance with the invention, the measurements from the individual scanning layers are not merged into a common 3D point cloud and evaluated together. The actual object detection rather remains within the respective scanning layers. The prepared presence information of safety-relevant objects in the individual scanning layers is then evaluated in a higher ranking and summarized manner as to whether the recognized constellation requires a safety-directed response.

The invention has the advantage that a safe and robust object or person detection is made possible on a multilayer scan. In this respect, unlike as with 3D cameras, the large scanning angles and high ranges of a scanning detection are used. The sensor in accordance with the invention is particularly suitable for mobile applications, for example on a vehicle. A better tolerance and robustness can be achieved than with a single-layer scanner. This relates to interfering objects such as dust or rain, an inclination of the sensor due to the installation position, or a movement in a mobile applications, and bumps, inclinations, or other contours of the ground. The evaluation remains simple to manage with small processing and memory capacities and to keep the theoretical demonstration of the safe detection capability that is required for use in safety engineering as clear as possible. In addition, existing software modules can continue to be used due to the evaluation initially restricted to single scanning layers.

The control and evaluation unit is preferably configured to trigger a safety-directed response on detection of the presence of an object in a plurality of scanning layers or in the bottommost scanning layer above the ground. A detected presence of an object in a plurality of scanning layers is thus generally demanded to trigger a safety-related response. This AND link of detected safety-relevant objects over a plurality of scanning layers provide increased robustness. A special case is a lying person who is possibly only detected in a single scanning layer due to a small cross-section offered to the sensor for scanning. This scanning layer is then necessarily the bottommost scanning layer above the ground. The determined presence of a safety-relevant object only in the one bottommost scanning layer above the ground is exceptionally preferably sufficient for the recognition of lying persons to trigger a safety-relevant response. The sensor is preferably restricted to a horizontal securing due to the relationship with the ground. The sensor is then at least roughly and overall aligned in parallel with the ground, which can naturally not apply to all the individual scanning layers that already form a non-parallel fan with respect to one another with a multilayer scanner.

The control and evaluation unit is preferably configured to determine the presence of an object in a plurality of scanning layers when the presence in the scanning layers is determined in the same or adjacent angular positions. The presence in the same or adjacent angular positions is a coherence condition. It should be the same object that is detected multiple times over the scanning layers. This is only the case when the detection takes place at the same or similar scanning or azimuth angle. A multiple detection of objects in a plurality of scanning layers with a large azimuth/angle distance is then not classified as safety-relevant, but as random simultaneous interference. The same or adjacent angular positions are preferably checked by discretized angle sectors. It is then required that the object in the plurality of scanning layers is detected in the same or in adjacent angle sectors. Adjacent here preferably means direct adjacency, that is there are no further angle sectors between adjacent angle sectors.

The control and evaluation unit is preferably configured to trigger a safety-directed response on a detection of the presence of an object in a number of scanning layers that is later with a near object than with a far object. In other words, a safety-directed response is only triggered for a near person or a near object on a detection of the presence in a larger number of scanning layers. Fewer scanning layers are sufficient for this purpose with a far person or a far object. Again in other words, the required coherence of the object detection over the scanning layers is greater at near than at far. The angular condition preferably continues to apply, i.e.

an object has to be detected over the scanning layers at the same or adjacent scanning or azimuth angles to trigger a safety-directed response.

The control and evaluation unit is preferably configured to trigger a safety-directed response for objects at a distance up to a first safe range on determination of the presence of an object in all the relevant scanning layers, with the first safe range in particular corresponding to the safe range of a safety laser scanner having only one scanning layer. At a distance of an object from the sensor up to a first safe range, a detection of an object is thus required in all the relevant scanning layers. This is understood under two conditions. Object detections are preferably only relevant up to a minimum height since small persons at a greater distance from the upper scanning planes are no longer detected. And an object detection of the bottommost scanning planes above the ground is preferably solely sufficient to consider the exceptional case of a lying person. On the one hand, those scanning layers are thus "relevant" in which an upright person is to be expected under all conditions. This could, for instance, be the range 50 mm to 1000 mm above the ground for a bent forward position. It must additionally be taken into account that a lying or sitting person likewise has to be detected. No coherence condition over a plurality of scanning layers is therefore required for the object detections close to the ground of, for example, 50 mm to 250 mm. A relaxed spatial filtering can be carried out here, however. Lying or sitting persons are detected at a much greater azimuth angle than a leg, for example. A minimal object resolution of 200 mm in the horizontal direction can be assumed by way of example here. The first safe range preferably corresponds to that of a comparable single-layer scanner that even still detects very dark targets and thus recognizes practically all objects. It is therefore precluded that a scanning layer does not detect an actually present object and it is therefore justified to require this detection for a safety-relevant object.

The control and evaluation unit is preferably configured to trigger a safety-directed response on detection of the presence of an object in at least two or more scanning layers that are in particular adjacent to one another for objects at a distance remote from the first safe range up to a second safe range. The lower limit for the number of scanning layers is thus preferably two, but can also be higher. It is a lower limit if a safety-relevant object was detected in more than this number of scanning layers if the condition for the triggering of a safety-relevant response is oversatisfied. The second safe range is greater than the first safe range and the sensor ensures only the detection of somewhat brighter objects at these greater distances. It is conceivable that a dark object in a scanning layer is overlooked in the region therebetween. It is, however, still conceivable that numerous scanning layers impinge on such dark object zones since a person is not completely clothed in pitch black velvet. It can thus no longer be expected that a person is detected in all the scanning layers in the distance region between the first and second safe ranges. The condition of a detection in only one single scanning layer would in turn be too weak; it would trigger a large number of false alarms. A safety-directed response is therefore triggered on detection of the presence of an object in at least two scanning layers, with the lower limit, as stated, being able to be greater than two. The number of scanning layers in which objects have to be simultaneously detected so that s safety-direction response is triggered can reduce with the distance from "all" up to the first safe range to "two" (or more) in the second safe range. A securing by the sensor is no longer ensured remotely from the second safe range.

The control and evaluation unit is preferably configured for a protected field evaluation in which an object is only safety-relevant when its position is disposed in a configured protected field. A classical protected field evaluation thus takes place within the individual scanning layers. In this respect, use can be made of proven existing procedures, algorithms, and software modules of conventional single-layer scanners. Protected fields are geometrical shapes with which parts of the scanning layer can be configured as safety-relevant. Not every object detection in a protected field automatically has to be a safety-relevant protected field intrusion. Minimum sizes and minimum time periods of object interventions can be required; for example the repeat detection in m of n scans, and there can also be permitted objects in the protected field and deactivated partial zones (muting, blanking). EP 3 220 164 B1 named in the introduction likewise presents suitable filters for a protected field evaluation. Protected fields are preferably configured in the same way in scanning layers disposed above one another, with a 3D shape of protected fields also being conceivable as a variant by different geometries over the scanning layers, including the definition of protected fields only in some and not all scanning layers. In which scanning layers and preferably also at which angular positions the presence of a safety-relevant object was found is known after the protected field evaluation and the overarching evaluation over scanning layers follows to trigger a safety-directed response as necessary.

Measurement is preferably on a pulse basis, with a transmission pulse being transmitted by the light beam for this purpose and a corresponding reception pulse being generated from the remitted light beam.

The control and evaluation unit is preferably configured to transmit a plurality of transmitted light pulses after one another, to scan the corresponding reception pulses with at least one threshold, and to accumulate then in a histogram and to determine the time of flight from the histogram. This embodiment therefore works with a multi-pulse method as in EP 2 469 296 B2 mentioned in the introduction.

The control and evaluation unit is configured to detect the location and/or orientation of the ground using the bottommost scanning layer or plurality of lower scanning layers. The sensor is preferably installed such that at least the bottommost scanning layer still impinges on the ground within the range. In the ideal case, the scanning beam of the bottommost scanning layer describes a circle on the ground or conversely measure a constant distance everywhere. Deviations from this ideal case allow a conclusion of a suitable mounting of the sensor or an inclination, or irregularity of the ground. The sensor becomes familiar with these circumstances, preferably in a teaching phase, in particular on the putting into operation after installation, particularly in mobile applications, but also during operation. The alignment and/or installation height of the sensor can be readjusted as required. With knowledge of the ground, which scanning layer is the bottommost at every distance that does not impinge on the ground and that can be used for the recognition of lying persons is then in particular clear for further operation.

The control and evaluation unit is preferably configured to only include objects up to a minimum height above the ground for the determination of the presence of a safety-relevant object. The minimum height corresponds to a lower limit for the height of persons who should still be safely detected. It would not be sensible to still require the detection at a height of, for example, 2 m because most persons are not so tall. Some scanning layers can, however, reach such heights, in particular at greater distances, and their detections should then be ignored in the decision whether a safety-direction response is to be triggered.

The control and evaluation unit is preferably configured to determine a height above the ground in dependence on the (detected) distance and scanning layer. This can be calculated from the taught ground and the location of the scanning layer fixed with respect to the sensor by sensor properties. The elevation angle of the scanning layer that is thus known is preferably used to determine, for a respective distance from the sensor, which scanning layer is the bottommost scanning layer above the ground, and/or which scanning layers extend higher than a minimum height of a person that are then preferably ignored for the evaluation whether a safety-directed response will be triggered.

The scanning layers preferably have an angular resolution at least close to the ground with respect to one another so that adjacent scanning layers have at most a distance corresponding to an object of a minimum size to be detected, in particular in accordance with the specification arctan(minimum size/range). The maximum range is in particular the above-defined second safe range. The scanning layers form a vertical fan and the vertical distance between two scanning layers is thus increased as the distance from the sensor increases. An object of a minimum size, for example a human body, should, however, also still be safely detected at the maximum range. The angle spread between the scanning layers may not become too large for this purpose. This can generally be calculated using the formula arctan(minimum size/range). The demand primarily applies directly above the ground since a person could not float between two higher scanning layers, even if the angle spread were greater there. The minimum size here relates to the height dimension or elevation; the object detection within a single scanning layer depends on other values than the angle spread between the scanning layers. The same angle or a different angle can be disposed between two respective scanning layers; the resolution of the scan in elevation is accordingly uniform or irregular.

The sensor is preferably configured as a safety sensor, in particular a safety laser scanner, in the sense of a safety standard for safety of machinery or electrosensitive protective equipment and in particular has a safety output for the output of a safety-directed securing signal. A safety sensor or a safety (laser) scanner is a safe sensor or a safe laser scanner in the sense of a safety standard and can therefore be used for personal protection at hazard sources. In the introduction, some relevant safety standards are named by way of example that are valid today and that differ regionally and in future in their specific wording, but not in their general approach of defect avoidance or finding errors in good time to avoid accidents due to defects or other unexpected behavior. If it is decided that a safety-directed response is to be triggered or if the sensor cannot ensure its own functional capability, this can be signaled to a monitored machine or to an interposed safety control at the safety output, in particular an OSSD (output signal switching device). This safety output is designed as safe, for instance designed with two channels, as part of the measures that satisfy the standards and serves as required for the initiation of a safety-directed measure such as an emergency stop or somewhat more generally for the establishing of a safe state.

The method in accordance with the invention can be further developed in a similar manner and shows similar advantages in so doing. Such advantageous features are described in an exemplary, but not exclusive manner in the subordinate claims dependent on the independent claims.

Figure 2:
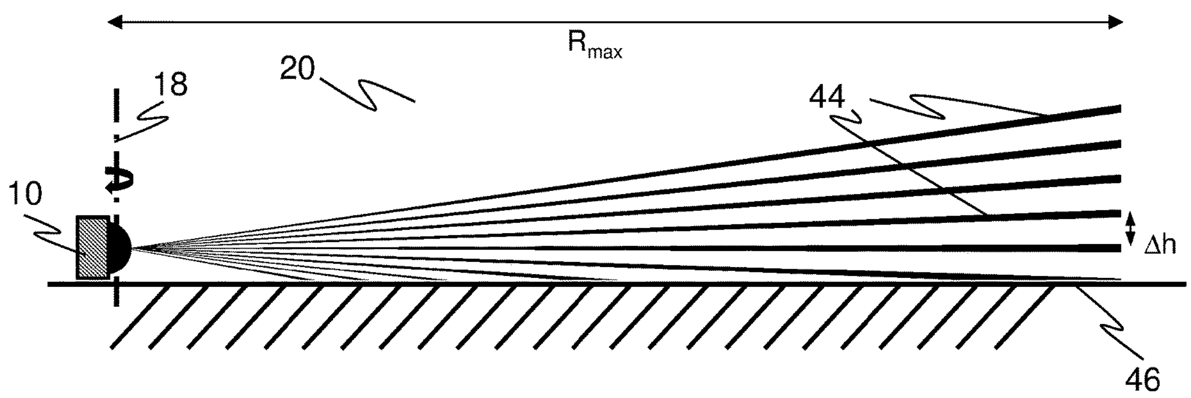
Figure 3:
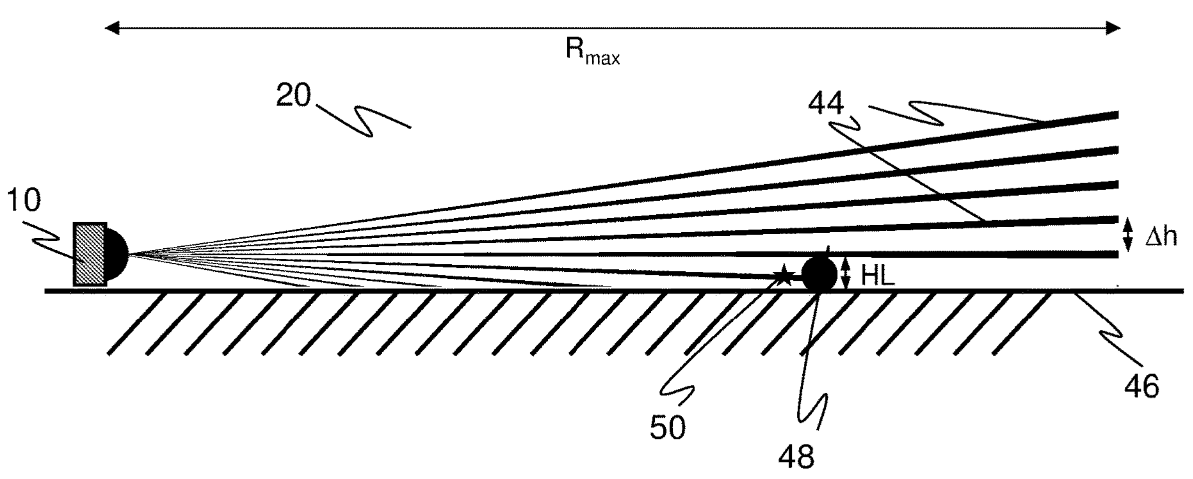
Figure 4:
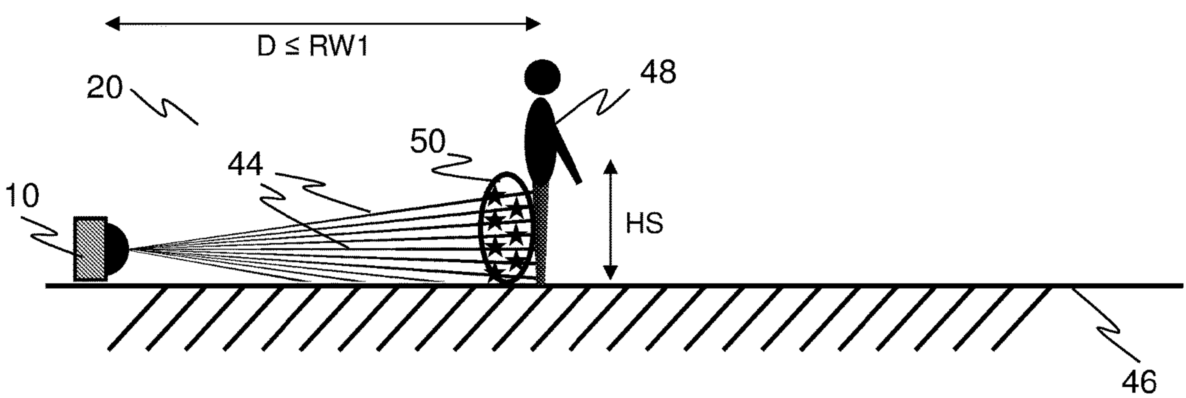
Figure 5:
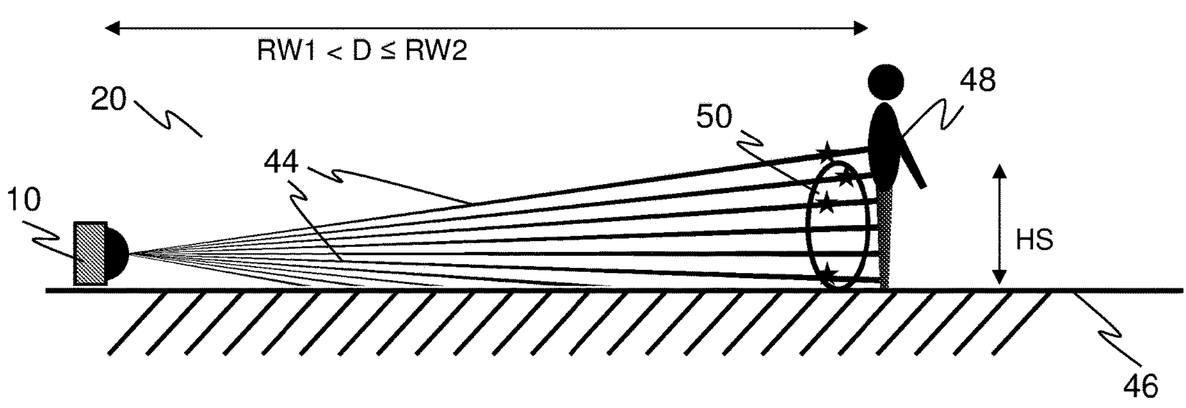
Figure 9:
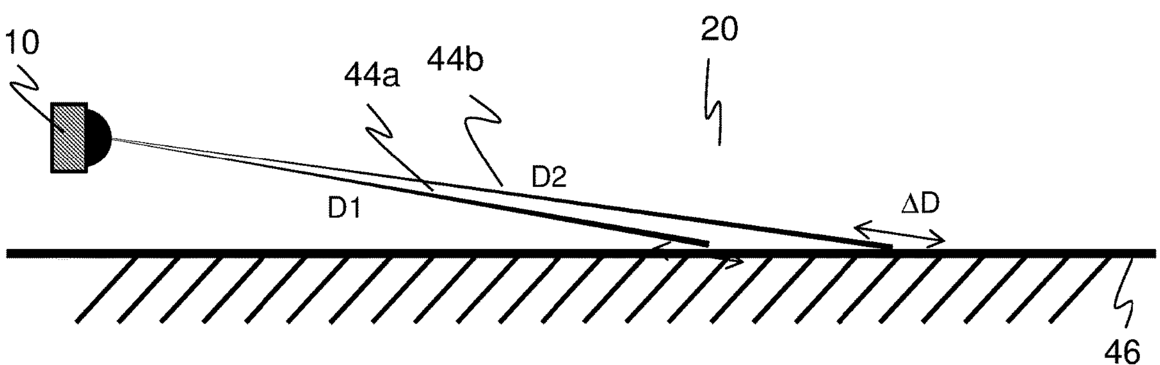
Figure 10:
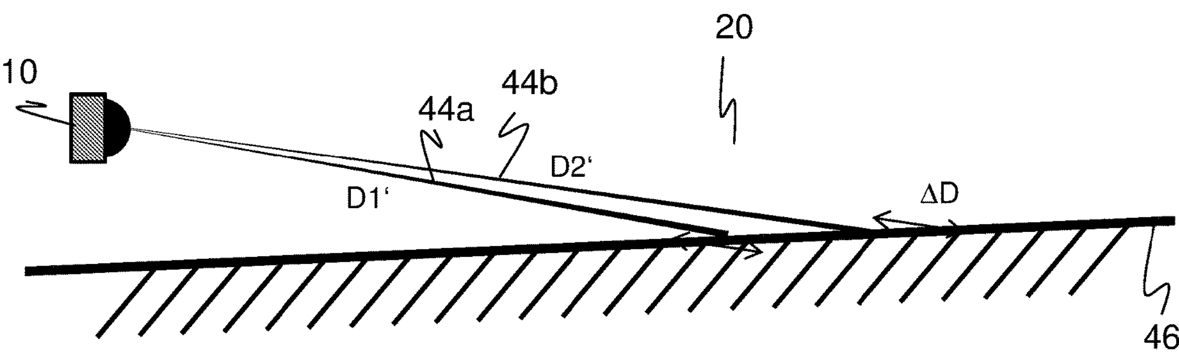

The invention will be explained in more detail in the following also with respect to further features and advantages by way of example with reference to embodiments and to the enclosed drawing. The Figures of the drawing show in:

FIG. 1 a schematic representation of a multilayer scanner;

FIG. 2 a schematic representation of the scanning layers monitored by a multilayer scanner;

FIG. 3 a schematic representation of the detection of a lying person by a multilayer scanner;

FIG. 4 a schematic representation of the detection of a person within a first safe range;

FIG. 5 a schematic representation of the detection of a person remote from the first safe range and within a second safe range;

FIG. 6 a table to illustrate a coherence condition of a detection of the same object in a plurality of scanning layers;

FIG. 7 a schematic representation of the detection of the ground by a bottommost scanning layer:

FIG. 8 a schematic representation of the detection of the ground similar to FIG. 7, now with an inclined ground;

FIG. 9 a schematic representation of the detection of the ground similar to FIG. 7, now with the two bottommost layers; and FIG. 10 a schematic representation of the detection of the ground similar to FIG. 7, now with the two bottommost scanning layers and with an inclined ground.

FIG. 1 shows a schematic sectional representation through an optoelectronic sensor 10 in an embodiment as a laser scanner in particular a multilayer scanner. The sensor 10 in a rough distribution comprises a movable scanning unit 12 and a base unit 14. The scanning unit 12 is the optical measuring head, whereas further elements such as a supply, evaluation electronics, terminals and the like are accommodated in the base unit 14. In operation, the scanning unit 12 is set into a rotational movement about an axis of rotation with the aid of a drive 16 of the base unit 14 to thus periodically scan a monitored zone 20.

In the scanning unit 12, a light transmitter 22 having a plurality of light sources 22*a*, for example LEDs or lasers in the form of edge emitters or VCSELs generates, with the aid of a transmission optics 24, a plurality of transmitted beams 26 having a mutual angular offset that are transmitted into the monitored zone 20. Instead of a plurality of light sources 22*a*, a beam splitting is also conceivable that splits the light of one single light source or of a plurality of light sources into transmitted light beams 26. If the transmitted light beams 26 impact an object in the monitored zone 20, corresponding remitted light beams 28 return to the sensor 10. The remitted light rays 28 are guided by a reception optics 30 to a light receiver 32 having a plurality of light reception elements 32*a* that each generate an electric received signal. The light reception elements 32*a* can be separate elements or pixels of an integrated matrix arrangement, for example photodiodes, APDs (avalanche diodes), or SPADs (single photon avalanche diodes). Instead of a common lens as the transmission optics 24 or reception optics 30, different optical elements can be used, for example arrangements of microlenses.

The purely exemplary four light sources 22*a* and light reception elements 32*a* are shown above one another. They can instead form a pattern into the plane of the paper or out of the plane of the paper, for example arranged on a circle line. The light transmitter 22 and the light receiver 32 are arranged together in this embodiment on a circuit board 34 that is disposed on the axis of rotation 18 and that is connected to the shaft 36 of the drive 16. This is only to be understood by way of example; practically any desired numbers and arrangements of circuit boards are conceivable. The basic optical design with light transmitters 22 and light receivers 32 biaxially disposed next to one another is also not compulsory and can be replaced with any construction design known per se of single-beam optoelectronic sensors or laser scanners. An example for this is a coaxial arrangement with or without beam splitters.

A contactless supply interface and data interface 38 connects the movable scanning unit 12 to the stationary unit 14. A control and evaluation unit 40 is located there that can at least partly also be accommodated on the circuit board 34 or at another site in the scanning unit 12. The control and evaluation unit 40 controls the light transmitter 22 and receives the received signals of the light receiver 32 for a further evaluation. It additionally controls the drive 16 and receives the signal of an angular measurement unit which is not shown, which is generally known from laser scanners and which determines the respective angular position of the scanning unit 12.

The distance from a scanned object is measured for a first part of the evaluation, preferably using a time of flight process known per se. Together with the information on the angular position of the angular measurement unit, two-dimensional polar coordinates of all object points in a sensing or scanning beam are available after every scanning period with angle and distance. The respective scanning plane is likewise known via the identity of the respective remitted light beam 28 and its detection in one of the light reception elements 32*a* so that a three-dimensional spatial zone is scanned overall by a plurality of scanning layers.

The sensor 10 it configured as a safety sensor for a use in safety engineering for monitoring a hazard source such as a hazardous machine represents. The sensor 10 is accordingly designed as safe to satisfy the demands of the safety standards named in the introduction corresponding to its safety level (for example SIL, safety integrity level, or PL, performance level). A protected field configured in advance field is, for example, monitored that may not be entered by operators during the operation of the machine. The protected field is respectively configured in a scanning layer, in a plurality of scanning layers, or over all the scanning layers and has the same or a different geometrical shape per scanning layer. How the control and evaluation unit 140 evaluates protected field infringements in individual scanning layers together over the scanning layers to recognize a possible hazard will be explained more exactly below with reference to FIGS. 2 to 10. If this evaluation comes to the conclusion that a safety-directed response has to take place, a corresponding safety-directed signal is output to an output 42 (OSSD, output signal switching device).

The sensor 10 shown is a laser scanner having a rotating measuring head, namely the scanning unit 12. Alternatively, a periodic deflection by means of a rotating mirror or by means of a facet mirror wheel is also conceivable. With a plurality of transmitted light beams 26, this has the disadvantage that how the plurality of transmitted light beams 26 are incident into the monitored zone 20 depends on the respective rotational position since their arrangement rotates by the rotating mirror as known geometrical considerations reveal. A further alternative embodiment pivots the scanning unit 12 to and fro. The scan movement for producing the scanning layer can furthermore instead also be produced using different known methods, for example MEMS mirrors, optical phase arrays, or acousto-optical modulators, in particular in embodiments in which one light source generates a plurality of transmission points.

During the rotation of the sensor 10, a respective area is scanned by each of the transmitted light beams 26. A plane of the monitored zone 20 is here only scanned in the geometric sense at an elevation angle of 0°, that is with a horizontal transmitted light beam not present in FIG. 1. The remaining transmitted light beams 26 strictly speaking scan the envelope surface of a cone that is designed as differently acute depending on the elevation angle. With a plurality of transmitted light beams 26 that are transmitted upward and downward at different angles, a kind of nesting of a plurality of hourglasses arises overall as a scanned structure. These fine geometric details will not be further looked at; the respective scanning zone of a transmitted light beam 26 is treated in a simplified manner as a scanning layer, which in accordance with what has been said, roughly, but not geometrically, corresponds to an exact scanning plane.

FIG. 2 schematically shows the scanning layers 44 of a horizontally mounted sensor 10 in a sectional representation. Horizontal means that the scanning layers 44 generally extend in parallel with the ground 46, with an exact parallelism not being able to be satisfied due to the fan-like arrangement of the scanning layers 44. The sensor 10 has a maximum range $R_{max}$ up to which the objects can still be safely detected and protected fields can be configured. A person in the monitored zone 20 should be detected in a plurality of scanning layers 44. The scanning layers 44 should therefore also not be spread too widely at a maximum range. A required vertical resolution Δh results from this that designates the distance of the scanning layers 44 in the vertical or elevation direction, with the spread between two respective scanning layers 44 being able to be of the same size, but also of different sizes. The vertical resolution Δh depends on the distance due to the sequential scanning layers 44 of different inclination; reference is made here to the distance corresponding to the maximum range $R_{max}$.

The special case of a person lying on the ground must still be considered who is only detected by a single scanning layer 44 under certain circumstances. It results from this that the vertical resolution Δh has to be finer at least close to the ground than a minimum height HL of a lying person. In a preferred embodiment, the spread of the scanning layers 44 is even and amounts at most to arctan (minimum height HL/maximum range $R_{max}$). In a numerical example having a maximum range $R_{max}$=10 m and a minimum height HL=200 mm, a maximum vertical spread of the scanning layers 44 results of arctan (200 mm/10 m)=1.15°.

FIG. 3 illustrates the special case of a person 48 who lies one the ground and who is modeled as a ball having a diameter of 200 mm. This takes account of the explained minimum height HL in the same way as the most unfavorable case of the extension in a horizontal direction when the person 48 lies, for example, oriented with the head or the feet toward the sensor 10 or wears clothing that only partially has sufficient reflectivity.

For the evaluation whether a hazardous situation is present because of which the sensor 10 should trigger a safety-directed response, the scanning layers 44 are first evaluated separately for themselves, for example by a conventional protected field evaluation of a single-layer sensor. In this respect, all the proven procedures and filters can be used that ignore small or transient interference objects as non-safety relevant or permit certain known objects.

The lying person 48 in FIG. 3 is only detected as a safety-relevant object in the bottommost scanning layer 44 above the ground 46 and triggers a corresponding object recognition 50, with the object recognition 50 preferably already meaning that all the conditions for a significant event have been satisfied within the respective scanning layer 44, that is in particular a protected field has been infringed in a safety-relevant manner. A single-layer scanner would respond in a safety-directed manner in a comparable situation. With a multilayer scanner, a higher ranking evaluation over the object recognitions 50 of the individual scanning layers 44 first follows. A lying person 48 here represents a special case since he will possibly only be detected one single time. To cover this special case, the sensor 10 should trigger a safety-directed response on an object recognition 50 in the bottommost scanning layer 44 above the ground 46.

FIGS. 4 and 5 illustrate the normal case of a standing person 48. HS here indicates a maximum height up to which an object recognition 50 is expected. Since the person 48 can stand in an unfavorable posture, bend over, for instance, an exemplary sensible specification for the maximum height is HS=1 mm.

In addition to the special case of a lying person 48 already discussed with respect to FIG. 3, two further cases of different distances D of the person 48 from the sensor 10 will still be distinguished in FIGS. 4 and 5. For a single-layer scanner, the minimum reflectivity R1 for the safe detection of an object is defined as 1.8% in the product standard IEC 61496-3. It can, however, be assumed that no person 48 is completely clothed in deep black velvet clothing. A detection can therefore also be expected at least for some of a plurality of scanning layers 44 even with a higher reflectivity R2>R1 of, for example, at least 6%. There are accordingly limit ranges or a first safe range RW1 and a second safe range RW2 corresponding to the reflectivities R1, R2 where RW1<RW2, up to which objects having a corresponding reflectivity are reliably detected. The relationship is non-linear since the sensitivity of the defection reduces quadratically as the distance D increases. In a numerical example, let a first safe range RW1=5.5 m be assumed for a reflectivity of R1=1.8%. A value of RW2=Squrt(6%/1.8%)*5.5. m=10 m can then be estimated for the second safe range RW2 at R2=6%.

According to these preliminary considerations, FIG. 4 now first shows the case of a person 48 at a distance D at most equal to the first safe range RW1. In accordance with the definition of the first safe range RW1, the sensor 10 is so sensitive at these distances D that there is a relevant object recognition 50 in all the scanning layers provided that the other conditions for safety relevance such as a position of the person 48 within a protected field are satisfied. It is precluded at these distances D that a person 48 is overlooked, for example, due to dark clothing. A safety-directed response is therefore triggered exactly on a relevant object recognition 50 in all the scanning layers 44 for a distance D up to the first safe range RW1.

It would in principle still be conceivable that a scanning layer 44 sweeps over the person 48 and therefore misses him. Such scanning layers 44 above the maximum height HS at the distance D are preferably ignored. Conversely, the bottommost scanning layers 44 possibly already impinge on the ground before the distance D. These too high and too low scanning layers 44 are explicitly not meant when the condition is made that a relevant object recognition 50 should be present in all the scanning layers 44. A further previously unobserved advantageous additional condition requires that the person 48 is detected over the scanning layers 44 at the same or at least similar angle positions. The coherence condition will be looked at in more detail below with reference to FIG. 6.

FIG. 5 shows the case of a person at a distance D between the first safe range RW1 and the second safe range RW2. It is here no longer ensured that all the scanning layers 44 deliver a relevant object recognition 50. In the illustration of FIG. 5, the person is wearing by way of example dark pants whose reflectivity is smaller than R2. This would still be sufficient for a reflectivity R1 and thus a detection within the first safe range RW1, but not for a detection remote from the first safe range RW1. At least parts of the person 48, however, have sufficient reflectivity R2 so that a relevant object recognition 50 takes place in a plurality of scanning layers 44. For these reasons, the condition for the triggering of a safety-directed response in the distance range RW1≤D≤RW2 is reduced and only a relevant object recognition 50 for at least two scanning layers 44 is still required. They must here additionally preferably be adjacent scanning layers 44. The statements with respect to FIG. 4 with respect to an ignoring of scanning layers 44 that are too high and too low also apply here; it even occurs with a greater likelihood because the scanning layers 4 fan out more as the distance D increases.

FIGS. 4 and 5 show a sharp case distinction with the demand for a relative object recognition 50 in all the scanning layers 44 up to the first safe range RW1 or at least two scanning layers 44 between the first safe range RW1 and the second safe range RW2. Finer gradations are conceivable in which the required number reduces as the distance D remote from the first range RW1 increases.

It must still be noted that the lying person 48 in accordance with FIG. 3 is admittedly detected in the vertical direction only by a single scanning layer 44. The assumption is, however, justified here that at least one point that has at least a reflectivity R2 is located above the horizontally scanned lying body. A case distinction between the first safe range RW1 and the second safe range RW2 is therefore not necessary for the lying person 48.

FIG. 6 is a table to illustrate an advantageous already addressed additional coherence condition. The relevant object recognitions 50 should be associated with the same object. This can be checked via similar angle positions or scanning or azimuth angles of the relevant object recognitions 50. The table shown includes only seven angular sectors in its columns for reasons of simplification; in practice, considerably more angular sectors can be distinguished at a typical angular resolution below one degree and an angle of vision of, for example, 270°, with relevant object recognitions 50 not having to stretch the underlying physical resolution to its limits. Three scanning layers 44 are listed in the rows by way of example; practical values are here also higher; for example at four, eight, ten, sixteen, or another or higher number of scanning layers 44. The scanning layers 44 are uniformly patterned in angular sectors. Relevant object recognitions are marked by an x a 0 stands for no safety relevant object detection or no safety relevant object detection after corresponding filtering.

The coherence condition should preferably only be considered as satisfied when the angular sectors of the relevant object recognitions 50 overlap or are direct neighbors or are directly adjacent. In the example of FIG. 6, this is given for the scanning layers #1 and the scanning layer #2 over the columns 2-4. The remaining scanning layer pairs in contrast do not satisfy the coherence condition.

A check of a coherence condition only using angular sectors is particularly resource saving. More complex processes are conceivable that, for example, also include the distance D of the respective relevant object recognition 50.

A ground recognition of the sensor 10 will now be explained with reference to FIGS. 7 to 10. Knowledge of the location of the ground 48 is, for example, useful for the special case in accordance with FIG. 3 of a lying person 48 to decide which scanning layers 44 above the ground 46 are the lowest or which scanning layers 44 have already impinged on the ground 48 at a distance D or sweep over the minimum height HL. The height H of an object recognition 50 can generally be determined at the distance D.

FIG. 7 first shows the case of an even ground 46 or of a correctly horizontally aligned sensor 10. The sensor 10 is mounted at a height H0 above the ground 46. The bottommost scanning layer 44*a* is directed toward the ground 47 at an angle α1 and preferably impinges on the ground 46 at all azimuth angles. In this respect, the angle of incidence should not become too shallow so that a sufficient signal still returns in particular with a shiny floor 46. The alignment of the ground 46 is analyzed, for example in a teaching or calibration phase, on the putting into operation of the sensor 10 using the measured values of the bottommost scanning layer 44*a*. Under ideal conditions as in FIG. 7, the same distance D1 from the ground 46 should be measured over all the azimuth angles. A variation outside a tolerance range ΔD means that the sight in the bottommost scanning layer 44*a* of the ground 46 is covered by an object or a ground structure is present, for example a hole in the ground 46. To reliably detect near objects, the latter case should be precluded in that a maximum value for bumps is specified for the ground 46.

FIG. 8 shows a comparable situation with an inclined ground 46 and/or an inclined mounting of the sensor 10. With a known installation height H0, this inclination can be determined using the measurements of the distances D1' in every scan angular direction.

FIGS. 9 and 10 in an analog manner illustrate the detection of the ground 46 by at least two of the lower scanning layers 44*a-b* with a straight ground 46 or in the case of an inclination. Two distances D1', D2' are then respectively detected that enable a still more differentiated analysis of the ground 46. If more complex ground structures are to be detected such as curbs, ramps, escarpments, curved bases, and the like, a more complex algorithm can be used for the ground recognition that possibly includes even more scanning layers 44. In mobile applications, the alignment of the sensor 10 to the ground 46 varies during operation so that then the ground 46 and its alignment are preferably regularly monitored.

With this knowledge of the installation height H0, the elevation angle of the respective scanning layer 44 known qua construction of the sensor 10, and the height and inclination of the ground 46 in the respective scanning direction, the height of a detected object can be determined for it respective object distance D. This should finally be illustrated by a numerical example. The optical center of the sensor 10 should form the coordinate origin. The scanning layers 44 have a respective spread angle from one another of 1°, with the eighth scanning layer extending horizontally. Let the sensor 10 be mounted at a known installation height H0=200 mm. On the detection of the ground 46, let a distance D1=1754 mm be measured by the bottommost scanning layer 44*a* for an azimuth angle of, purely by way of example, 90°. The bottommost (first) scanning layer 44*a* is tilted by 7° downwardly, namely seven times by 1° against the horizontal eighth scanning layer. It results from this by elementary trigonometric considerations that the ground 46 is inclined by −0.5° at the azimuth angle 90° with respect to the coordinate system of the sensor 10. An object at the distance of 5 m is now detected by the tenth scanning layer at the azimuth angle 90°. The tenth scanning layer is tilted by 2° upwardly, namely twice by 1° against the horizontal eighth scanning layer. The −0.5° inclination of the ground 46 and the installation height H0=200 mm are still to be considered. A height thus results in a good approximation of sin(2°+0.5°)*5,000 mm+200 mm=418 mm.

The invention claimed is:

1. An optoelectronic sensor for detection of objects in a monitored zone, comprising:

at least one light transmitter for transmitting a plurality of mutually separated light beams;

at least one light receiver for generating a respective received signal from the light beams remitted in the monitored zone;

a movable deflection unit for periodically guiding the transmitted light beams through the monitored zone to scan a plurality of scanning layers during movement of the movable deflection unit, the plurality of scanning layers respectively corresponding to the plurality of mutually separated light beams; and a control and evaluation unit that is configured to acquire information on the objects in the monitored zone from the respective received signal, wherein the control and evaluation unit is further configured to determine, in each of the scanning layers, a presence of a safety-relevant object per scanning layer, such that each of the scanning layers is individually evaluated to determine the presence of the safety-relevant object therein, wherein the control and evaluation unit is further configured to, following the determination of the presence of the safety-relevant object per scanning layer, decide whether a safety-directed response is triggered by a common evaluation of each of the determinations of the presence of the safety-relevant object per scanning layer, wherein the safety-directed response is triggered on detection of a presence of the safety-relevant object in a plurality of the scanning layers, and wherein the safety-directed response is further triggered on detection of the presence of the safety-relevant object in only a bottommost scanning layer above a ground.

2. The optoelectronic sensor in accordance with claim 1, wherein the optoelectronic sensor is a laser scanner.

3. The optoelectronic sensor in accordance with claim 1, wherein the control and evaluation unit is further configured to measure a distance by means of a time of flight process using the respective received signal.

4. The optoelectronic sensor in accordance with claim 1, wherein the control and evaluation unit is further configured to determine the presence of the safety-relevant object in the plurality of scanning layers when the presence in the scanning layers is determined in the same or adjacent angular positions.

5. The optoelectronic sensor in accordance with claim 1, wherein the control and evaluation unit is further configured to trigger the safety-directed response on a detection of the presence of the safety-relevant object in a number of scanning layers that is greater with a near object than with a far object.

6. The optoelectronic sensor in accordance with claim 1, wherein the control and evaluation unit is further configured to trigger the safety-directed response for objects at a distance up to a first safe range on determination of the presence of the safety-relevant object in all relevant scanning layers.

7. The optoelectronic sensor in accordance with claim 1, wherein the control and evaluation unit is further configured to trigger the safety-directed response on detection of the presence of the safety-relevant object in at least two or more scanning layers at a distance remote from a first safe range up to a second safe range.

8. The optoelectronic sensor in accordance with claim 7, wherein the at least two or more scanning layers are adjacent to one another at the distance remote from the first safe range up to the second safe range.

9. The optoelectronic sensor in accordance with claim 1, wherein the control and evaluation unit is further configured for a protected field evaluation in which an object is only safety-relevant when its position is disposed in a configured protected field.

10. The optoelectronic sensor in accordance with claim 1, wherein the control and evaluation unit is further configured to detect at least one of a location and orientation of the ground using the bottommost scanning layer or a plurality of lower scanning layers.

11. The optoelectronic sensor in accordance with claim 1, wherein the control and evaluation unit is further configured to only include objects up to a minimum height above the ground for the determination of the presence of the safety-relevant object.

12. The optoelectronic sensor in accordance with claim 1, wherein the control and evaluation unit is further configured to determine a height above the ground depending on the distance and the scanning layer.

13. The optoelectronic sensor in accordance with claim 1, wherein the scanning layers have an angular resolution so that adjacent scanning layers have, at most, a distance corresponding to an object of a minimum size to be detected with respect to one another.

14. The optoelectronic sensor in accordance with claim 13, wherein the angular resolution is defined by a predetermined threshold.

15. The optoelectronic sensor in accordance with claim 1, wherein the optoelectronic sensor is configured as a safety sensor in the sense of a standard for safety of machinery or electrosensitive protective equipment.

16. The optoelectronic sensor in accordance with claim 15, further comprising a safety output for the output of a safety-directed securing signal.

17. The optoelectronic sensor in accordance with claim 15, wherein the safety sensor is configured as a safety laser scanner.

18. A method of detecting objects in a monitored zone, comprising:

transmitting a plurality of mutually separated light beams into the monitored zone;

periodically guiding the plurality of mutually separated light beams through the monitored zone to scan a plurality of scanning layers during movement of a movable deflection unit, the plurality of scanning layers respectively corresponding to the plurality of mutually separated light beams;

generating a respective received signal from light beams remitted in the monitored zone; and acquiring information on the objects in the monitored zone from the respective received signal, wherein a presence of a safety-relevant object per scanning layer is determined in each of the scanning layers, such that each of the scanning layers is individually evaluated to determine the presence of the safety-relevant object therein, wherein, following the determination of the presence of the safety-relevant object in each of the scanning layers, a decision is made whether a safety-directed response is triggered by a common evaluation of each of the determinations of the presence of the safety-relevant object per scanning layer, wherein the safety-directed response is triggered on detection of the presence of the safety-relevant object in a plurality of the scanning layers, and wherein the safety-directed response is further triggered on detection of the presence of the safety-relevant object in only a bottommost scanning layer above a ground.

19. An optoelectronic sensor for detection of objects in a monitored zone, comprising:

at least one light transmitter for transmitting a plurality of mutually separated light beams;

at least one light receiver for generating a respective received signal from the light beams remitted in the monitored zone;

a movable deflection unit for periodically guiding the transmitted light beams through the monitored zone to scan a plurality of scanning layers during movement of the movable deflection unit, the plurality of scanning layers respectively corresponding to the plurality of mutually separated light beams; and a control and evaluation unit that is configured to acquire information on the objects in the monitored zone from the respective received signal, wherein the control and evaluation unit is further configured to determine, in each of the scanning layers, a presence of a safety-relevant object per scanning layer, such that each of the scanning layers is individually evaluated to determine the presence of the safety-relevant object therein, the presence of the safety-relevant object being determined by detection of the safety-relevant object within a protected field defined by each of the scanning layers, wherein the control and evaluation unit is further configured to, following the determination of the presence of the safety-relevant object per scanning layer, decide whether a safety-directed response is triggered by a common evaluation of each of the determinations of the presence of the safety-relevant object per scanning layer, wherein the safety-directed response is triggered on detection of a presence of the safety-relevant object in a plurality of the scanning layers, and wherein the safety-directed response is further triggered on detection of the presence of the safety-relevant object in only a bottommost scanning layer above a ground.

* * * * *